US009942130B2

United States Patent
Ulevitch et al.

(10) Patent No.: US 9,942,130 B2
(45) Date of Patent: Apr. 10, 2018

(54) SELECTIVE ROUTING OF NETWORK TRAFFIC FOR REMOTE INSPECTION IN COMPUTER NETWORKS

(71) Applicant: Cisco Technology, Inc., San Jose, CA (US)

(72) Inventors: David Ulevitch, San Francisco, CA (US); Geoff Townsend, Pleasanton, CA (US); Yariv Keinan, San Francisco, CA (US); Lucas Siba, Langley (CA)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 14/821,537

(22) Filed: Aug. 7, 2015

(65) Prior Publication Data

US 2016/0197830 A1    Jul. 7, 2016

Related U.S. Application Data

(60) Provisional application No. 62/100,611, filed on Jan. 7, 2015.

(51) Int. Cl.
*H04L 12/28* (2006.01)
*H04L 12/707* (2013.01)
(Continued)

(52) U.S. Cl.
CPC .......... *H04L 45/22* (2013.01); *H04L 12/4633* (2013.01); *H04L 45/74* (2013.01);
(Continued)

(58) Field of Classification Search
CPC ....... H04L 45/745; H04L 45/22; H04L 67/00; H04L 45/74; H04L 12/4633; H04L 63/101; H04L 47/32
See application file for complete search history.

(56) References Cited

U.S. PATENT DOCUMENTS 7,533,166 B2    5/2009  Beyda
2004/0225895 A1  11/2004  Mukherjee et al.
(Continued)

FOREIGN PATENT DOCUMENTS

CN    101909010 A    12/2010

OTHER PUBLICATIONS

International Search Report and Written Opinion in counterpart International Application No. PCT/US2015/066988, dated Mar. 14, 2016, 9 pages.
(Continued)

*Primary Examiner* — Ayaz Sheikh
*Assistant Examiner* — Hai-Chang Hsiung

(57) ABSTRACT

A client analyzes requests for network resources to determine an IP address associated with the request, such as a destination IP address of a network packet. The client device selectively routes the request and other traffic associated with the IP address. The client device establishes a tunnel or other direct connection with a remote server. Network traffic can be selectively routed to the destination IP address associated with a resource request, or to the remote server based on the destination IP address associated with the request. The system can route client network requests to the remote server based on a category or other information associated with the destination IP address. Network packets associated with malicious or suspicious IP addresses, for example, may be routed to the remote server for performance of security features, while packets associated with other IP addresses may be directly routed to their target destination.

18 Claims, 9 Drawing Sheets

(51) Int. Cl.
*H04L 12/46* (2006.01)
*H04L 12/741* (2013.01)
*H04L 29/08* (2006.01)
H04L 29/06 (2006.01)
H04L 12/823 (2013.01)

(52) U.S. Cl.
CPC .............. *H04L 67/00* (2013.01); *H04L 47/32* (2013.01); *H04L 63/101* (2013.01)

(56) References Cited

U.S. PATENT DOCUMENTS

| | | |
|---|---|---|
| 2008/0144623 A1 | 6/2008 | Lindgren |
| 2010/0130170 A1* | 5/2010 | Liu ................... H04W 36/0022 455/411 |
| 2013/0133063 A1* | 5/2013 | Abu-Amara .......... H04L 63/029 726/22 |
| 2013/0262714 A1 | 10/2013 | Wei et al. |
| 2014/0098671 A1* | 4/2014 | Raleigh ................ H04M 15/80 370/235 |
| 2016/0057654 A1* | 2/2016 | Backholm ......... H04W 52/0277 370/236 |
| 2016/0173371 A1* | 6/2016 | Bays ...................... H04L 45/42 370/389 |

OTHER PUBLICATIONS

"Policy Enhancements", AT&T, SA WG2 Temporary Document, TD S2-092661, 3GPP TSG SA WG2 Meeting #72, Mar. 30-Apr. 3, 2009, Hangzhou, China, XP50345895, 7 pages.

* cited by examiner

SELECTIVE ROUTING OF NETWORK TRAFFIC FOR REMOTE INSPECTION IN COMPUTER NETWORKS

CLAIM OF PRIORITY

The present application claims priority from U.S. Provisional Patent Application No. 62/100,611, entitled "Selective Routing of Network Traffic for Remote Inspection in Computer Networks," by Ulevitch, et al., filed Jan. 7, 2015, incorporated by reference herein in its entirety.

BACKGROUND OF THE INVENTION

Field of the Invention

Embodiments in accordance with the present disclosure relate to computer networks, and particularly to security in computer networks.

Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

Malware such as computer viruses, Trojan horses, worms, botnets and the like is often distributed over the Internet as or with network resources. Numerous anti-malware products exist that detect, block and/or remove malware from devices. Over time, particular domain names or IP addresses may become associated with the distribution of malware. So-called blacklists have been developed that list domains associated with malware. Domains may be identified for placement on a blacklist in numerous ways. For example, researchers can retrieve network resources and analyze the content of the resource for the presence of malware. Similarly, software can analyze the content of network resources to detect the presence of malware. Once identified, these domain names can be added to a blacklist and published for use by network devices.

DETAILED DESCRIPTION

Figure 1:
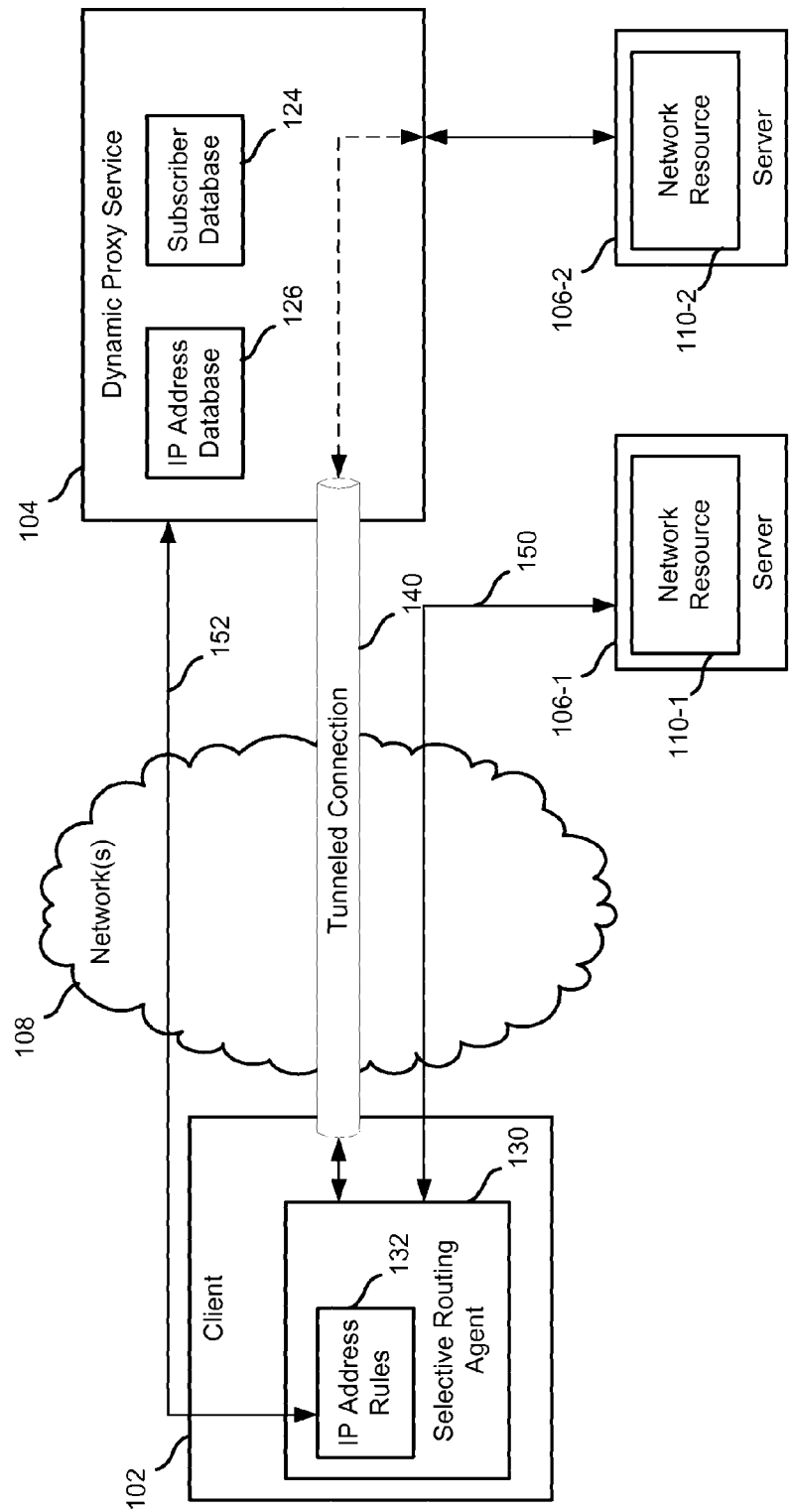
FIG. 1 is a simplified block diagram of a computer network describing a process of selectively routing network traffic for remote inspection according to one embodiment.

The disclosed technology is directed to routing network traffic in computer networks for selective application of security features based on internet protocol (IP) addresses associated with the traffic. A client or other remote device analyzes network packets such as requests for network resources to determine an IP address associated with the request, such as a destination IP address of a network packet. Based on the IP address, the client device selectively routes the request and other traffic associated with the IP address. The client device establishes a tunnel or other direct connection with a remote server. Network traffic can be selectively routed to the destination IP address associated with a resource request, or to the remote server based on the destination IP address associated with the request. In this manner, the system can route client network requests to the remote server based on a category or other information associated with the destination IP address. Network packets that are associated with malicious or suspicious IP addresses, for example, may be routed to the remote server for performance of various security features to handle the network packet, while packets associated with other IP addresses may be directly routed to their target destination.

The client device includes a selective routing agent that is configured to provision a tunnel or other direct connection to a remote server or group of servers that provide a proxy service. The selective routing agent configures the client device for selective routing of network traffic through the tunnel based on the IP address associated with a resource request. In one example, the selective routing agent receives a set of IP address-based rules from the proxy service. The IP address-based rules are used to selectively route network traffic to the proxy service for remote inspection or handling based on the IP address of the network request. In one example, the rules include a first set of IP addresses, such as a list of tunneled IP addresses, for which requests are to be routed through the tunnel to the proxy service. The tunneled IP addresses may include blacklisted IP addresses associated with malicious or suspicious activity, for example. The tunneled IP addresses may also include other categories of IP addresses, such as those for which traffic is to be routed to the proxy service for auditing or other purposes, but that are not otherwise suspicious or malicious IP addresses. The rules may also or alternatively specify a second set of IP addresses, such as list of whitelisted IP addresses, for which requests are to be routed directly to their target or destination IP address. Requests for IP addresses that are not whitelisted can be routed through the tunnel to the dynamic proxy service.

In one embodiment, the selective routing agent updates one or more routing tables associated with the client device. For example, the agent may access routing tables provided by the operating system at the client device. Using the IP address-based rules, the agent modifies the routing tables to configure the client to selectively route network traffic based on the IP address associated with the request. For example, the agent may specify in the routing tables a set of whitelisted IP addresses for routing using a default gateway at the client device, such as a default interface with a remote network. The agent may specify in the routing tables that IP addresses outside of the whitelisted IP addresses be routed to an IP address for the tunnel formed with the proxy service.

The selective routing agent and proxy service communicate to efficiently identify at the client device IP addresses for which requests should be routed to the remote proxy service. It can be expected that the number of IP addresses to be tunneled, such as those associated with malicious or otherwise unwanted activity, may increase over time. Communicating a large list of IP addresses to client devices, and managing such a large number of IP addresses at the client device for selective routing may consume unnecessary resources. The disclosed technology includes techniques for intelligently and dynamically updating lists of whitelisted and/or tunneled IP addresses for efficient communication to and handling by client devices.

In one embodiment, the selective routing agent develops a list of tunneled IP addresses for selective routing to the proxy service dynamically based on the client request behavior. The selective routing agent accesses network requests as they are issued and determines if the destination IP address has a known categorization to the agent. For example, the agent may determine if the IP addresses have been previously whitelisted or blacklisted by the selective routing agent or by an initial set of IP rules pushed to the client device. If an IP address does not have a known categorization, the selective routing agent queries the proxy service, passing the requested destination IP address of the client.

The proxy service determines whether the IP address should be whitelisted or tunneled by the client device. The proxy service issues a reply to the query instructing the selective routing agent to either add the IP address to a whitelist or a tunneled list. In this manner, the initial setup of the client device may include provisioning a small number, or even no IP addresses, on a whitelist or tunneled list. Over time, a whitelist and optionally a tunneled list can be established at the client device for IP addresses that the particular client device attempts to access. Accordingly, a large list of all known whitelisted IP addresses need not be sent to the client device. Similarly, a large list of tunneled IP addresses need not be sent to the client device. Instead, each client may develop its own set of whitelisted or tunneled IP addresses based on the actual traffic originating from the client. In this manner, each client device will include routing tables for selective routing packets to the proxy service that are based on a particular client device's previous requests.

In another example of dynamically developing a tunneled IP address list, the selective routing agent initializes all unknown IP addresses for routing through the tunnel. The unknown IP addresses are those for which the proxy service has not sent information or rules to the selective routing agent. The agent may modify the routing tables so that all unknown IP addresses are routed through the tunnel. The proxy service may optionally pass a small list of whitelisted IP addresses which are used to initialize some IP addresses for routing through the default interface, but this is not required. In this manner, all network traffic from the client associated with non-whitelisted IP addresses is directed through the tunnel to the proxy service.

When the proxy service receives a packet from the client, it determines whether the requested IP address should be whitelisted. If so, the selective routing agent sends a rule to the client device to whitelist the IP address so that future requests for the IP address are not routed through the tunnel. In this manner, the client device can begin with a set of zero or more whitelisted IP addresses that is small when compared with the known number of benign IP addresses listed at the proxy service. The client device will route any non-whitelisted requests through the tunnel. The proxy service can then update the client device over time to whitelist IP addresses that a particular client device actually requests.

The dynamic proxy service is configured to intelligently route, block, or proxy resource requests received from the tunnels with client devices. The proxy service may utilize whitelisted, blacklisted, and/or other categorizations of IP addresses to determine how to handle client resource requests. Moreover, the proxy service may apply subscriber preferences in determining how to process client resource requests. In one embodiment, the proxy service makes an initial determination of whether to directly route a client request to the destination IP address or to block the client resource request. The initial determination may be made based on a port and/or protocol associated with the resource request. The initial determination may additionally be made based on the IP address of the request. Some IP addresses, for example, may be fully blacklisted so that all associated requests are blocked. Other IP addresses for example, may by fully whitelisted so that all associated requests are directly routed to their destination IP address upon receipt at the proxy service.

The proxy service is further configured in one embodiment to pass a subset of the client resource requests to a proxy engine that selectively proxies the resource requests. For example, the proxy service may route some requests to the proxy engine based on the port and/or protocol associated with the request. The proxy service may route some requests to the proxy engine based on their destination IP address. The proxy engine can block, redirect, or proxy the resource request. For example, the proxy engine may inspect the resource request to determine the actual resource that is requested. In this manner, the dynamic proxy engine may block access to some resources associated with an IP address, while allowing access to other resources associated with the same IP address.

FIG. 1 is a simplified block diagram of a system for selectively routing computer network traffic to a remote server for security inspection and/or dynamic proxying in one embodiment. Client 102, dynamic proxy service 104, and servers 106-1 and 106-2 are in communication over one or more network(s) 108. Servers 106-1 and 106-2 can include one or more web server, application servers, and other computing devices that host or otherwise provide access to network resources 110-1 and 110-2, respectively. Servers 110-1 and 110-2 are associated with individual IP addresses that permit remote devices such as client 102 and dynamic proxy service 106 to access network resources 110-1 and 110-2 over network 108. A single client 102 and two servers 110-1 and 110-2 are provided by way of example only. Any number of clients 102 and servers 110-1 and 110-2 that host network resources may be used in accordance with embodiments of the disclosed technology.

Network(s) 108 can include any combination of local area networks, wide area networks (WAN), the Internet, and/or any other network. The dynamic proxy service 104 can vary by implementation and include any suitable computing system such as a server, group, grid, or distributed platform of computer systems. The dynamic proxy service may include a cluster formed of an application server(s) and/or web server(s) in one example. The dynamic proxy service 106 is formed of hardware and/or software configured as described for performing dynamic routing and proxying as part of network processing. Client 102 may include, by way of non-limiting example, various computing devices such as mobile devices (e.g., smartphones), personal computers, servers, workstations, mainframes, etc.

A client 102 is typically associated with a subscriber such as an individual and/or entity that agrees to service conditions of an operator of dynamic proxy service 104, although this is not required. Subscribers may range from entities operating large networks, such as those provided by a wireless service providers or large corporations, to individuals having a home internet connection. A subscriber may operate its own network with multiple clients 102, but that is not required. In a simple example, the subscriber may operate a single personal computer as a client with an internet connection.

Client 102 includes a selective routing agent 130 that provisions a tunneled connection 140 to dynamic proxy service 104. Tunneled connection 140 may include any type of tunneling protocol or tunneled connection. The tunneled connection transfers network packets as generated by the client device. The tunnel may encapsulate the originating packets. Any type of protocol may be encapsulated and transmitted using the tunnel. The address information, including a source and destination IP address, are encapsulated for transmission to the proxy service. In one embodiment, the tunnel transmits the entire network packet generated by the client 102 as the data portion or payload of a tunnel network packet. Any type of tunneling protocol such as VPN, IPSec, and L2TP may be used, for example.

In this manner, the client device includes multiple network interfaces. A first network interface such as a default gateway is provided that interfaces directly with network 108 to send and receive packets directly with a computing device located by an IP address. A second network interface is provisioned for the tunneled connection, allowing packets associated with a subset of IP addresses to be selectively routed to dynamic proxy service 104.

Selective routing agent 130 selectively routes network traffic from client 102 based on an IP address associated with network requests from the client. Selective routing agent 130 is configured to apply a set of IP address rules 132 that are associated with the dynamic proxy service 104. The IP address rules configure client 102 to selectively route network traffic either to dynamic proxy service 104 over tunneled connection 140, or directly to a requested network resource 110 as represented by connection 150. Client 102 can receive the IP address rules from proxy service 104 over a backchannel connection 152 in one example. The rules may be transmitted to the client using any protocol such as HTTP/HTTPs, FTP, etc. In another example, the IP address rules 132 may be received over other connections to service 104, such as through tunneled connection 140, as well as from a third-party entity or service separate from proxy service 104.

The IP address rules include different combinations of lists of tunneled IP addresses and whitelisted IP addresses in various embodiments. For example, the IP address rules include a list of tunneled IP addresses without a list of whitelisted IP addresses in one embodiment. The selective routing agent 130 routes network requests for IP addresses on the tunnel list from client 102 to dynamic proxy service 104 by issuing a network request over the tunneled connection 140. The selective routing agent 130 routes network requests for IP addresses not on the tunnel list conventionally from client 102 directly to a server 106 by issuing a network request with the requested IP address.

In another example, the IP address rules include a list of whitelisted IP addresses without a list of tunneled IP addresses. The selective routing agent 130 routes network requests for IP addresses not on the whitelist from client 102 to dynamic proxy service 104 by issuing a network request over the tunneled connection 140. The selective routing agent 130 routes network requests for IP addresses on the whitelist by issuing a standard network request with the destination IP address over a conventional gateway connection. In yet another example, the IP address rules include a list of tunneled IP addresses and a list of whitelisted IP addresses.

IP address rules 132 are dynamically updated at client 102 by dynamic proxy service 140. Proxy service 104 maintains an IP address database 126. Database 126 may include any type of information to discriminate or otherwise describe known properties associated with an IP address. For example, database 126 may include the list of tunneled IP addresses and the list of whitelisted IP addresses in one example. As described hereinafter, subscriber information from database 124 may be used with various IP address information to develop tunnel lists and whitelists that are specific to individual subscribers. IP address database 126 is updated over time as IP addresses are discovered that are suspicious or associated with malware. As IP address database 126 is updated, dynamic proxy service sends down modifications or updates to the IP address rules at client 102. IP address database 126 may also be updated to identify IP addresses that are not blacklisted, but nevertheless are to be proxied by the dynamic proxy service for auditing, investigatory, or other purposes.

Dynamic proxy service 104 applies various proxy and security features to network requests from client 102 to service a portion of the network traffic originating with client 102. Proxy service 104 receives network requests for network resources such as network resource 106-2 over tunneled connection 140. Proxy service 104 utilizes various IP address information from database 126 to determine how each network request should be processed. Proxy service 104 may block, redirect, or pass through network traffic based on IP address, and optionally, additional information. The proxy service may block network requests associated with some IP addresses. The proxy service may route requests to a null interface to terminate the network traffic flow associated with a request. Proxy service 104 may directly route some network requests from client 102 to a server 110 without proxying, while proxying other requests on behalf of the client. The proxy service can issue one or more requests to a target server 106 using a destination IP address and return one or more resources to the client 102 using network resources 110 received from the remote server. The proxy service may block access to some network resources 106 associated with an IP address, while proxying requests for other network resources associated with the same IP address. In this manner, the proxy service may selectively allow access to different resources associated with a single IP address.

Figure 2:
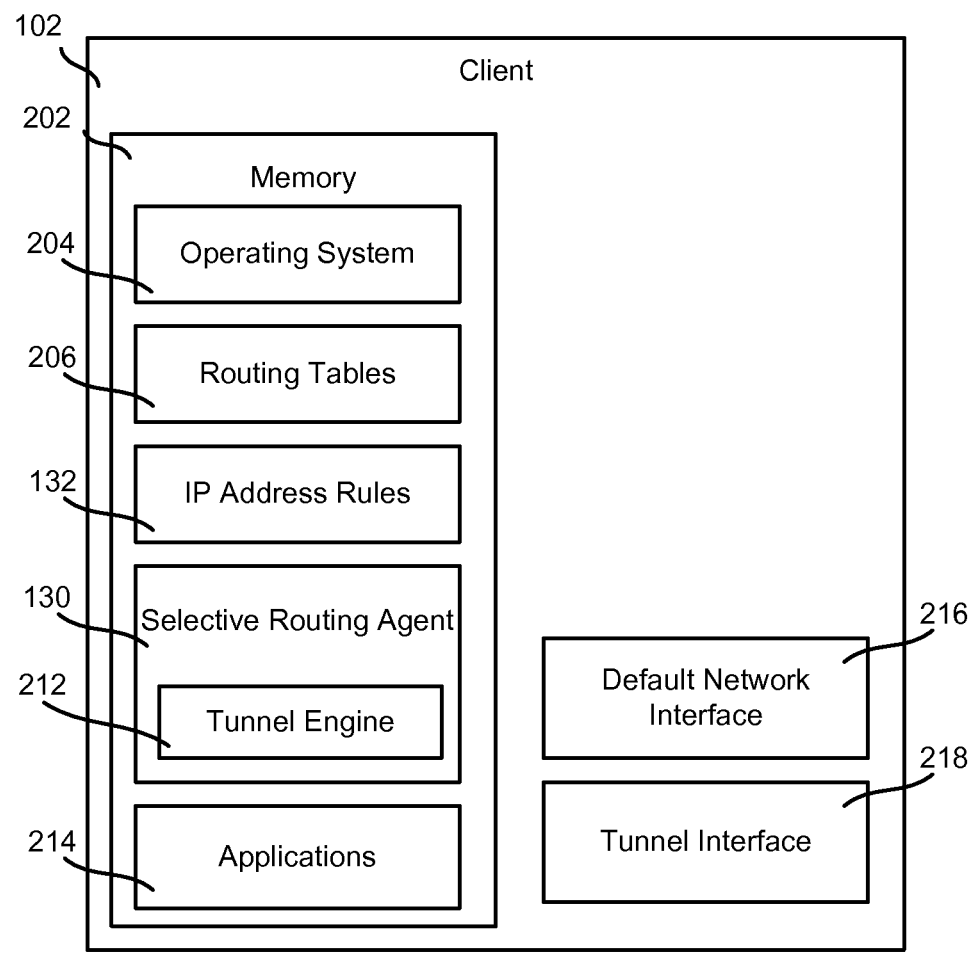
FIG. 2 is a simplified block diagram of a client computing device including a selective routing agent for selectively routing network traffic according to one embodiment.

FIG. 2 is a simplified block diagram showing further details of a client 102 in accordance with one embodiment. FIG. 2 shows a subset of the components of a computing device in one example that has been configured with a selective routing agent 130. Client 102 includes a memory such as dynamic random access memory or other memory that programs one or more processors (not shown) to perform various functions, including routing for network requests to access resources external to the client device. Client 102 includes a default network interface 216 which may include hardware and/or software that enables communication using such protocols as DNS, TCP/IP, UDP/IP, and HTTP/HTTPS, among others. Operating system 204 manages the execution of various applications 214 at the client 102, including but not limited to web browsers, games, productivity software, etc. In many instances, applications 214 use IP addresses to access network resources that are external to the client 102. Operating system 204 uses routing tables 206 to determine where to route packets from client 102 using an IP address associated with the packet. For example, operating system 204 may access routing tables 206 to determine where to route packets such as network requests associated with applications 214. Operating system 204 may route packets to a default network interface 216 for communication over the Internet, for example, based on routing tables 206.

Selective routing agent 210 configures client 102 to modify routing of network traffic such as packets sent from client 102 to external resources. Selective routing agent 210 includes a tunnel engine 212 that establishes and manages the tunneled network connection 140 with the external dynamic proxy service 104. Tunnel engine 212 establishes a direct connection with proxy service 104 through tunnel interface 218. In this manner, client 102 includes separate network connections as provided by the default network interface 216 and the tunnel interface 218. Tunnel interface 218 provides a connection to proxy service so that packets are received at the proxy service 104 in the same form as they were issued from client 102. The tunnel engine may encapsulate and transmit packets using any type of protocol. The tunneled network connection provides a direct connection between client 102 and proxy service 104 so that the integrity of the network packets is maintained between the two remote devices. In one example, the direct connection is a virtualized direct connection that causes proxy service 104 to appear as the next network router, a so-called next hop, in the network topography. The connection may appear direct by virtue of the tunnel, even where other network routers are provided between the client 102 and proxy service 104.

Selective routing agent 130 receives IP address rules 132. Rules 132 may comprise an initial set of rules that are dynamically updated by proxy service 104 to provide an up-to-date and dynamically changing configuration at the client 102. Selective routing agent 130 accesses rules 132 as they are updated to configure client 102 using routing tables 206 in one embodiment. Rules 132 may include lists of categorized IP addresses as earlier described for example. The rules 132 are used to modify routing tables 206 so that different categories of IP addresses are routed through interfaces 216 and 218, selectively by the client device. In this manner, the proxy service 104 is capable of dynamically managing and assigning IP addresses for routing to the proxy service 104 over the tunneled connection 140, while other IP addresses are routed directly in accordance with their destination IP address over network interface 216. This permits network traffic for tunneled IP addresses to be routed selectively to the proxy service 104, while other network traffic remains routed from the client 102 in its traditional manner.

A network packet can include a packet, cell, message, or signal for transmitting network traffic. Packets that may be routed may include but are not limited to http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, etc.

Figure 3:
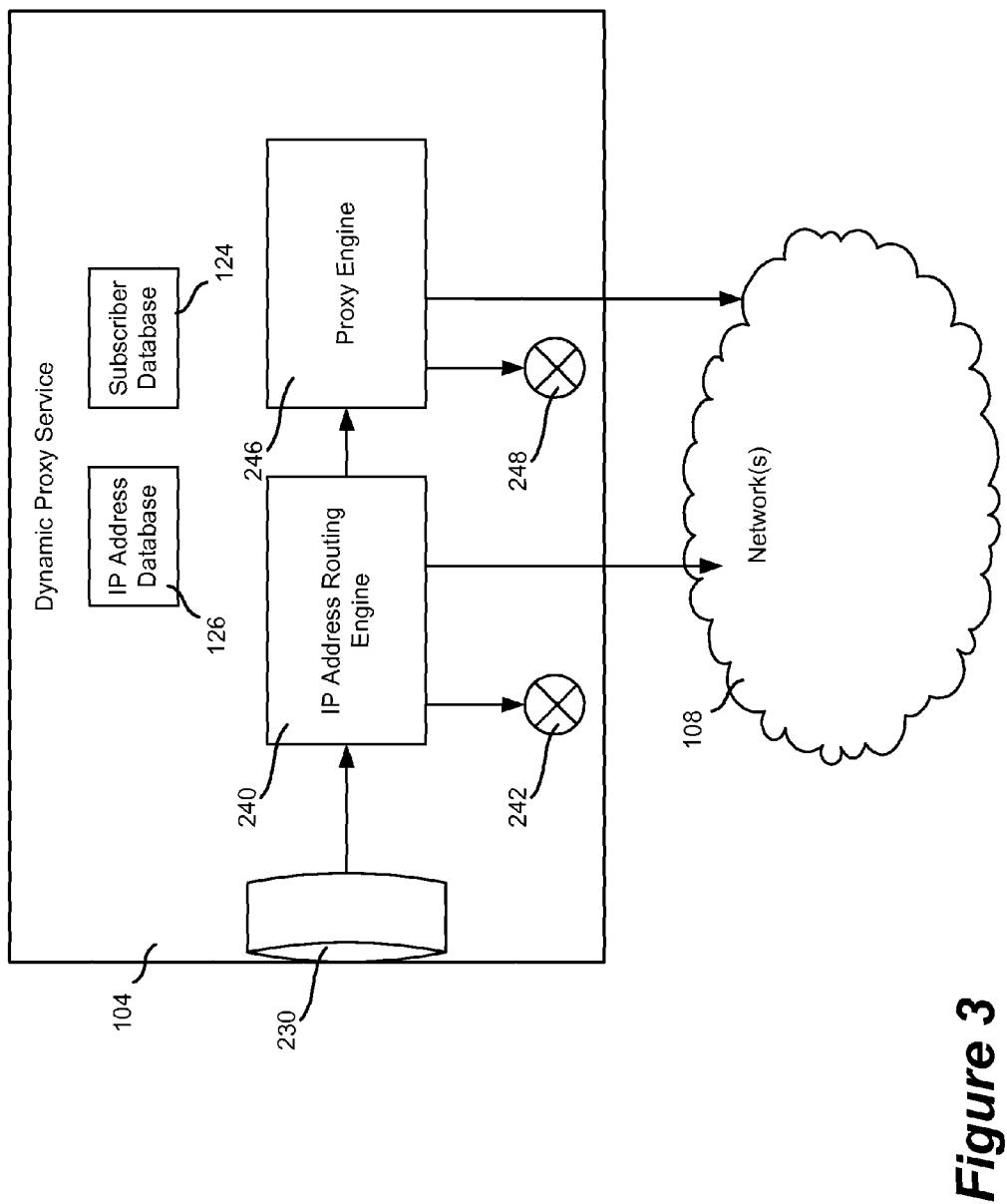
FIG. 3 is a simplified block diagram of a proxy service for selective routing and proxying of network traffic according to one embodiment.

FIG. 3 is a simplified block diagram of a dynamic proxy service 104 in accordance with one embodiment. FIG. 3 shows a subset of the components of a computing device in one example that has been configured to dynamically process network requests from clients 102 for resources from remote servers 110. The proxy service may include any number of applications servers, web servers, etc. forming a computing cluster or cloud that can service clients 102 across one or more networks 108. The proxy service 104 includes a tunnel interface 230 that is configured to communication over tunneled connections 140 with a plurality of clients 102. Tunnel interface 230 manages multiple tunneled connections to provide virtualized direct connections between the clients 102 and the proxy service 104. In this manner, the proxy service 104 will receive network packets from the clients in a direct link such that the devices appear as next hop connections in the network topography.

Network packets are received at the dynamic proxy service and passed to an IP address routing engine 240. IP address routing engine 240 applies a first set of rules or security features to the network packets as received. Routing engine 240 examines each network packet to determine the protocol and port associated with the packet, as well as the destination IP address of the packet. Routing engine 240 can make initial routing decisions based on this initial inspection. Routing engine 240 can forward the network packet to network 108 so that the packet is processed according to standard network protocols, e.g., in a next hop routing to its destination address. Routing engine 240 may terminate the network packet at a null interface 242. At null interface 242, the dynamic proxy service 104 may apply null processing so that routing of the packet stops. In another example, proxy service may issue a redirect reply to the client 102 at null interface 242. Finally, the routing engine 240 may also pass the network packet to dynamic proxy engine 246.

In one embodiment, IP address routing engine 240 is configured to terminate all network requests associated with particular protocols and/or ports. For example, any traffic arriving at the proxy service with an unknown port or protocol, as a result of blacklisting for example, may be terminated at the proxy service 104. Routing engine 240 may be further configured to terminate network traffic associated with a first set of IP addresses. For example, a set of IP addresses to be completely blocked for all network traffic may be provided in IP address database. Routing engine 240 can be configured to terminate any network requests associated with this first set of IP addresses. This first set of IP addresses may include a block list of IP addresses known to be malicious in some manner such that no network traffic is routed to them.

IP address routing engine 240 is configured in one embodiment to pass network traffic associated with some IP addresses to proxy engine 246 for dynamic proxying. Proxy engine 246 may selectively process network packets based on information from IP address database 126 and/or information from subscriber database 124. Proxy engine 246 determines a destination IP address and optionally a client identifier associated with network packet. Each network packet is then processed by the proxy engine 246 in accordance with its IP address and optionally, subscriber information from database 124.

Proxy engine 246 may block network traffic at null interface 248, for example, by issuing a null response or redirecting the network traffic to a redirect resource. Proxy engine 246 may proxy network traffic by issuing a request to the destination IP address for the requested resource, then return the requested resource in a reply to the client using tunneled connection 140.

Routing engine 240 and proxy engine 246 may access subscriber database 124 in order to making routing decisions. For example, subscriber information in database 124 may be provided so that different subscribers may provide preferences to control routing decisions. In this manner, a first subscriber may elect to have traffic associated with a first category of IP addresses be blocked, while a second subscriber elects to have that traffic proxied. As such, routing engine 240 may terminate network traffic for a first category of IP addresses when the traffic is associated with the first subscriber, and route the traffic direction to the destination IP address or using proxy engine 246 for the second subscriber.

The IP addresses in database 124 may be associated with or have therein one or more flags. A flag can be any indicator, marking, or symbol associated with a domain name or IP address. A flag may be used to identify any type of information for a particular address. For example, a flag may be used to mark an address as suspicious or untrustworthy, such as an address associated with a site associated with malware or engaged in pharming or phishing activities. A flag may also indicate that an IP address hosts illegal material, hate speech, pornography, material related to drugs or alcohol, or otherwise objectionable material that a subscriber does not wish to access or permit access to. Any number of flags can be used to create any number of categorizations for addresses. Different levels of security risks may be denoted by flags. Flags may also indicate that a particular IP address is to be audited or logged.

Client 102 may be associated with a client identifier. A client identifier discriminates the sender, owner, user, or subscribing entity associated with network traffic. Some examples of a client identifier are IP addresses, user id's, and secure tokens. The dynamic proxy service may inspect the network traffic to determine a source IP address of a packet, for example. A username or secure token may be included in network requests for example. The dynamic proxy service 104 may process requests from client 102 using a client identifier and subscriber information from subscriber database 124 at the service, but this is not required.

In one example, the proxy service accesses subscriber information from database 124. The proxy service can apply subscriber preferences in the subscriber information to generate a reply to the resource request from the client 102. For example, the subscriber information may indicate that the subscriber or user associated with the subscriber can or cannot access the destination IP address or a domain name associated with the IP address. If the subscriber information indicates that the subscriber cannot access the IP address, the proxy service may include the IP address in a list of tunneled IP addresses provided to the client.

A subscriber may set one or more preferences or selections for categorizations of IP addresses that are to be sent through the proxy service over the tunneled connection. Preferences or settings for a subscriber may be stored as subscriber information at subscriber database 124 or in one or more storage devices accessible to the proxy service. Upon identifying the subscriber preferences, the proxy service can correlate them with the flags for the IP addresses to determine what IP addresses should be tunneled for a given client. The proxy service may send IP address-based rules 132 to the client device to alter the handling of traffic including IP addresses of the categories.

Figure 4:
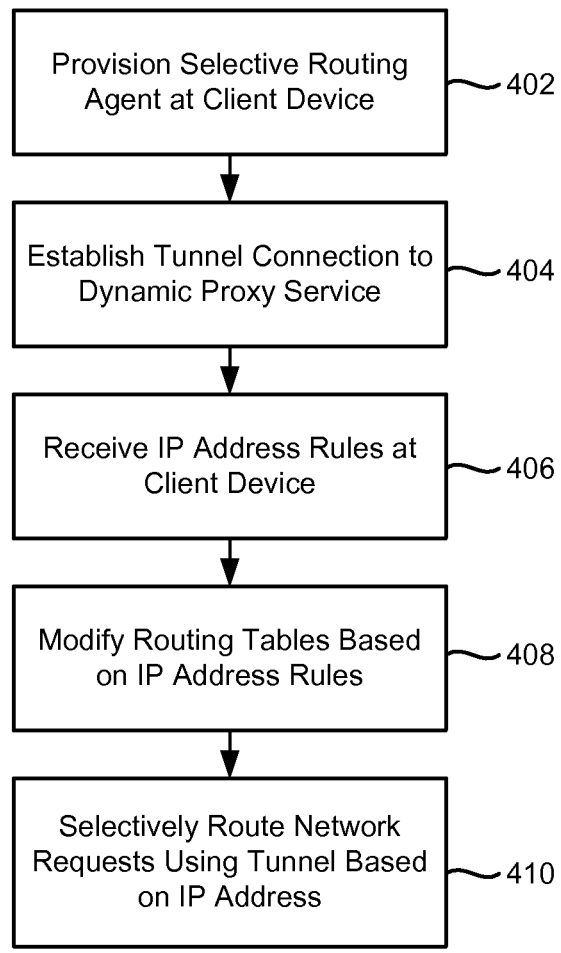
FIG. 4 is a flowchart describing a process at a client device for selective routing of network traffic based on an IP address associated with the network traffic

FIG. 4 is a flowchart describing a process at a client device for selective routing of network traffic based on an IP address associated with the network traffic. At step 402, a selective routing agent is provisioned at the client device. Step 402 includes receiving the selective routing agent from or in association with a dynamic proxy service in one embodiment. The selective routing agent establishes a tunneled connection to the dynamic proxy service at step 404. The tunneled connection establishes a direct interface between the client and proxy service so that network packets are received from the client in the same form as their issuance. At step 406, the selective routing agent receives a set of IP address-based rules associated with the dynamic proxy service. The IP address-based rules may specify a set of IP addresses that are to be routed to the dynamic proxy service and/or a set of IP addresses that are to be routed over a direct network connection to their destination IP address.

The IP address rules at step 406 can be received at any time. The rules may be modified and updated over time to dynamically modify routing of the network traffic from the client. By way of example, the dynamic proxy service may send to the selective routing agent IP addresses that are to be added to a list of tunneled or whitelisted IP addresses. This may occur as the dynamic proxy service determines that IP addresses are malicious, or are to be audited by the service, for example. Moreover, the list of IP addresses may be developed dynamically based on the client request behavior.

At step 408, the selective routing agent modifies one or more routing tables based on the IP address based rules. The modifications can be performed in various ways to enable network traffic at the client device to be selectively routed to the dynamic proxy service. In one example, the selective routing agent lists in the routing tables IP addresses or ranges of IP addresses that are to be routed to the dynamic proxy service. The routing tables may specify an IP address associated with the dynamic proxy service as a destination for traffic associated with these IP addresses. The routing tables may also be modified to specify that whitelisted IP addresses are to be routed over the standard gateway interface at the client device. The routing tables may be modified over time as additional IP address rules are received. In this manner, the routing tables are dynamically updated in accordance with the rules pushed down to the client 102 from or in association with the proxy service.

At step 410, the client 102 selectively routes network traffic based on the rules using the tunneled connection to the proxy service. Applications at the client device, for example, may issue network requests using IP addresses. An operating system may access routing tables to determine a destination for the IP address. The selective routing agent modifies the routing tables so that specified IP addresses may be routed to the dynamic proxy service, while other IP addresses are routed using a standard network interface to an external network. The client will thus issue some network requests over the tunneled connection with the dynamic proxy service, while other requests are routed over a standard network connection. In this manner, the proxy service is able to push rules to the client that cause selective routing by the client device of network requests based on IP address.

Figure 5:
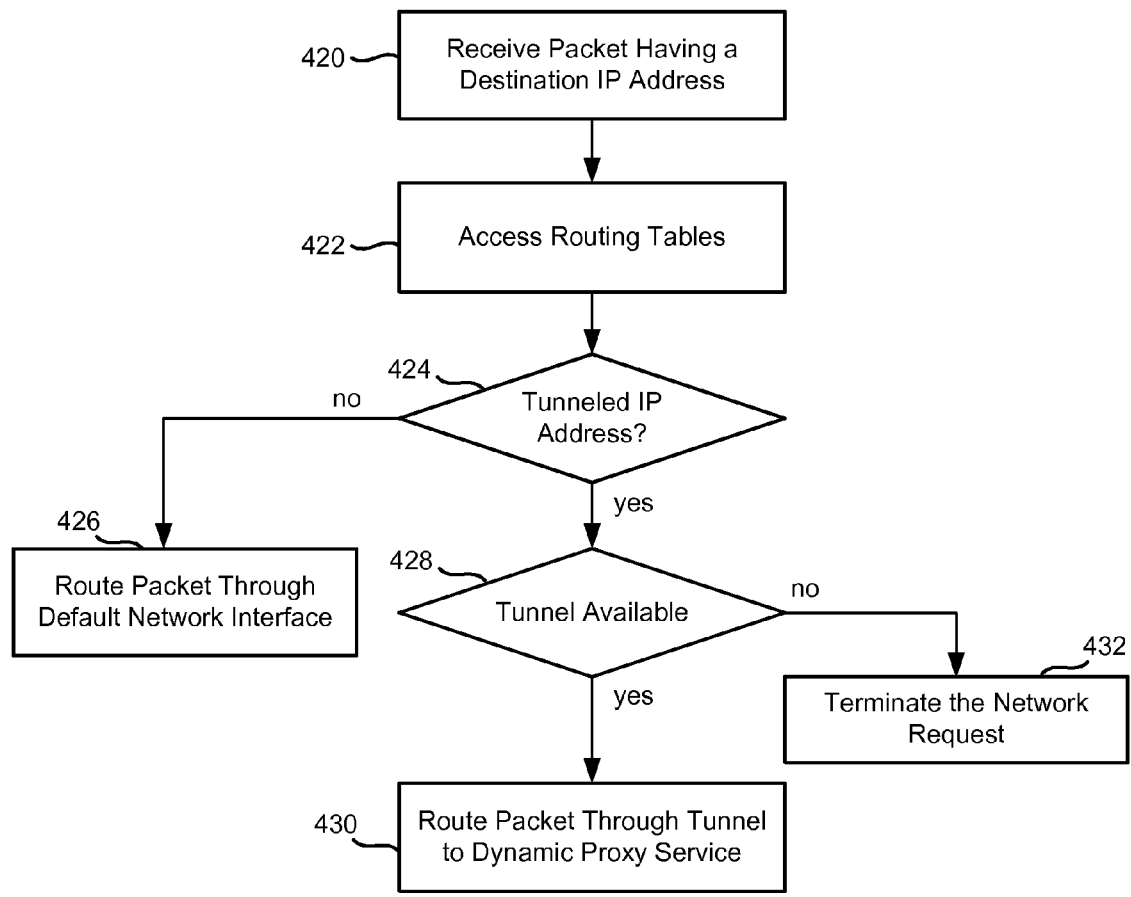
FIG. 5 is a flowchart describing a process at a client device for selectively routing network traffic in accordance with a set of IP address-based rules.

FIG. 5 is a flowchart describing a process at a client device for selectively routing network traffic in accordance with a set of IP address-based rules. At step 420, a network packet is received at the client device having a destination IP address. The network packet is received at an operating system from an application at the client device in one example. At step 422, the client device accesses one or more routing tables to determine where to send the network packet. For example, the operating system may locate the destination IP address or a range including the destination IP address in the tables. The operating system may then determine a routing destination such as the next node in the routing path for the IP address.

The client device determines at step 424 whether the routing tables specify that the destination IP address be routed over the tunneled connection with the proxy service. If the routing tables specify a standard routing destination, such as the standard network interface at the client device, the client device routes the network packet at step 426. At step 426, the operating system may issue the network packet to an external network over a standard network interface.

If the routing tables specify that the network traffic be routed over the tunneled connection, the client device determines whether the tunneled connection is available at step 428. If the tunnel is available, the client device routes the network packet at step 430. At step 430, the operating system may issue a network request to the proxy service over a tunnel interface creating the tunneled connection to the proxy service. If the tunneled connection is not available, the client device terminates the resource request at step 432 in one embodiment. In this manner, the proxy service can cause malicious or other domains to have their network traffic terminated at the client device if the proxy service is unavailable to examine and determine how to process the request. This enables protection by the selective routing agent should the proxy service be unavailable.

Figure 6:
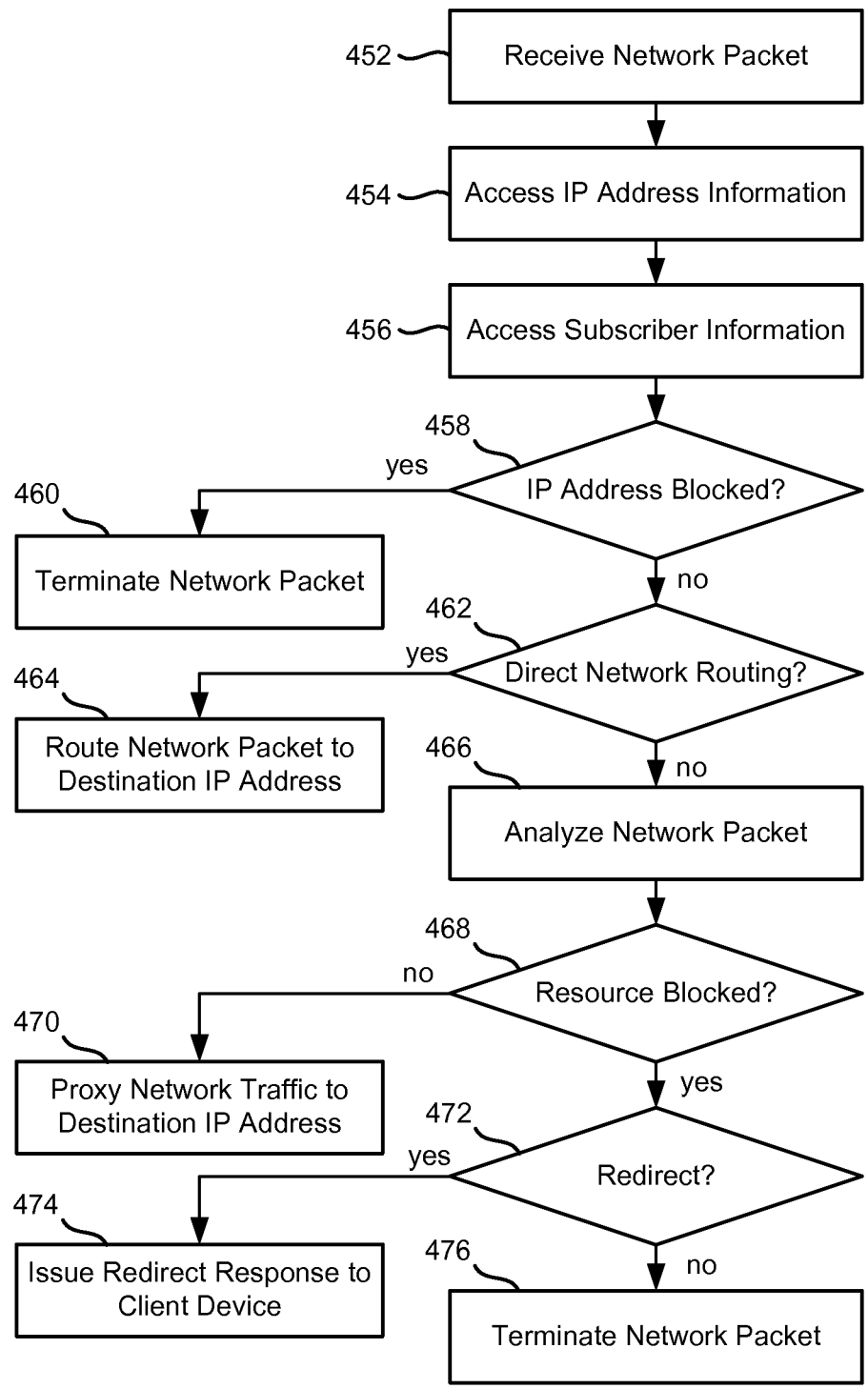
FIG. 6 is a flowchart describing a process at a proxy service for dynamically routing network traffic received from a tunneled connection with a client device.

FIG. 6 is a flowchart describing a process at a proxy service for dynamically routing network traffic received from a tunneled connection with a client device. At step 452, the proxy service receives a network packet at a network interface for a tunneled connection with a client device. The packet, such as a resource request, may be transmitted using any available protocol and is not limited to HTTP/HTTPS traffic for example. The proxy service may be configured to accept packets that use any protocol, whether known or unknown. At step 454, the proxy service accesses IP address information associated with the packet. The proxy service determines the destination IP address of the packet, and determines information relating to the IP address from database 126 in one example. The proxy service can determine a category of the IP address, whether the IP address belongs to any whitelists, blacklists, or other information previously gathered and stored by the proxy service.

At step 456, the system optionally determines subscriber information associated with the network packet. The proxy service may determine a client identifier, for example, and a set of preferences or rules for routing traffic associated with the client identifier. Step 456 is optional as the system may route all network traffic according to the same set of rules without using subscriber information in one embodiment. At step 458, the proxy service determines whether the IP address is blocked. At step 458, the system may block access to some IP addresses, such as IP addresses on a blacklist. Step 458 may include applying subscriber information determined at step 456. For example, the system may correlate a set of subscriber preferences indicating categories of IP addresses that the subscriber wants to be blocked. In this manner, some subscribers may choose to block access to IP addresses that may not be malicious and blacklisted, but that the subscriber otherwise chooses not to view.

If the proxy service determines that the IP address should be blocked, either by inclusion on a blacklist, or by correlating subscriber preferences, the proxy service terminates the network packet at step 460. In one example, the proxy service can send the packet to a null interface to terminate the packet. In another example, the proxy service may terminate the packet by dropping the packet. In another example, the proxy service may terminate the packet by replying to the network packet with a redirect universal resource indicator (URI). The URI may point to an alternate resource for the client to retrieve.

The proxy service may terminate some network packets without consideration of its IP address. For example, the system may block all packets having a particular protocol. In some cases, the system may block packets associated with unknown protocols. The system may also block packets that are associated with a particular port number, for example. These initial determinations may be made to prior to determining IP address information to increase efficiency.

If the IP address is not to be blocked, the proxy service determines whether packets for the IP address should be directly routed at step 462. If the packets for the IP address should be directly routed, the proxy service directly routes the packets at step 464. The client connection is not terminated, and the proxy service simply releases or issues the original request that was received from the tunneled connection in one example. In one embodiment, the proxy service may change an internal source IP address supplied by the client to a public source IP address of the proxy service before releasing the packet at step 464.

If the network packet is not terminated at step 460 or directly routed at step 464, the proxy service analyzes the network packet at step 466. For example, the proxy service may examine a particular resource that is requested from the IP address. The proxy service may compare the analysis with information in IP address database 126 and/or subscriber information in database 124 to determine how to route the packet. Step 466 may include determining how traffic associated with a particular network resource should be routed. In this manner, the proxy service may allow access to some content at an IP address, while blocking access to other content at the same IP address.

At step 468, the proxy service determines if the requested resource should be blocked. At step 468, the proxy service may correlate subscriber information with the resource information to determine whether the particular subscriber is permitted access to the requested resource. If the resource is not blocked, the proxy service proxies the network traffic for the destination IP address at step 470. The proxy service may issue a network request corresponding to the received network traffic at step 470. The proxy service may issue a network request (after changing a source IP address, e.g.) to the destination IP address, and receive a network reply containing the requested resource. The proxy service then generates a network reply to the client passing the requested resource. Step 470 may include determining whether the network packet should be audited or logged. The proxy service may store records of network packet traffic by a subscriber, or use the network packet to determine information relating to the IP address for future routing decisions.

If the requested resource is blocked, either generally or for the particular client, the proxy service determines whether to redirect the network traffic at step 472. If the network packet is to be redirected, the proxy service provides a redirect URI to the client for an alternate resource at step 474. The redirect resource may be provided by a web server operated with the proxy service in one embodiment. Subscriber information is used to generate a particular redirect response in one example. In this manner, a subscriber may choose or tailor a redirect reply to be provided to clients for traffic associated with the subscriber. If the requested resource is blocked and a redirect is not to be issued, the proxy service terminates the network packet at step 476.

Figure 7:
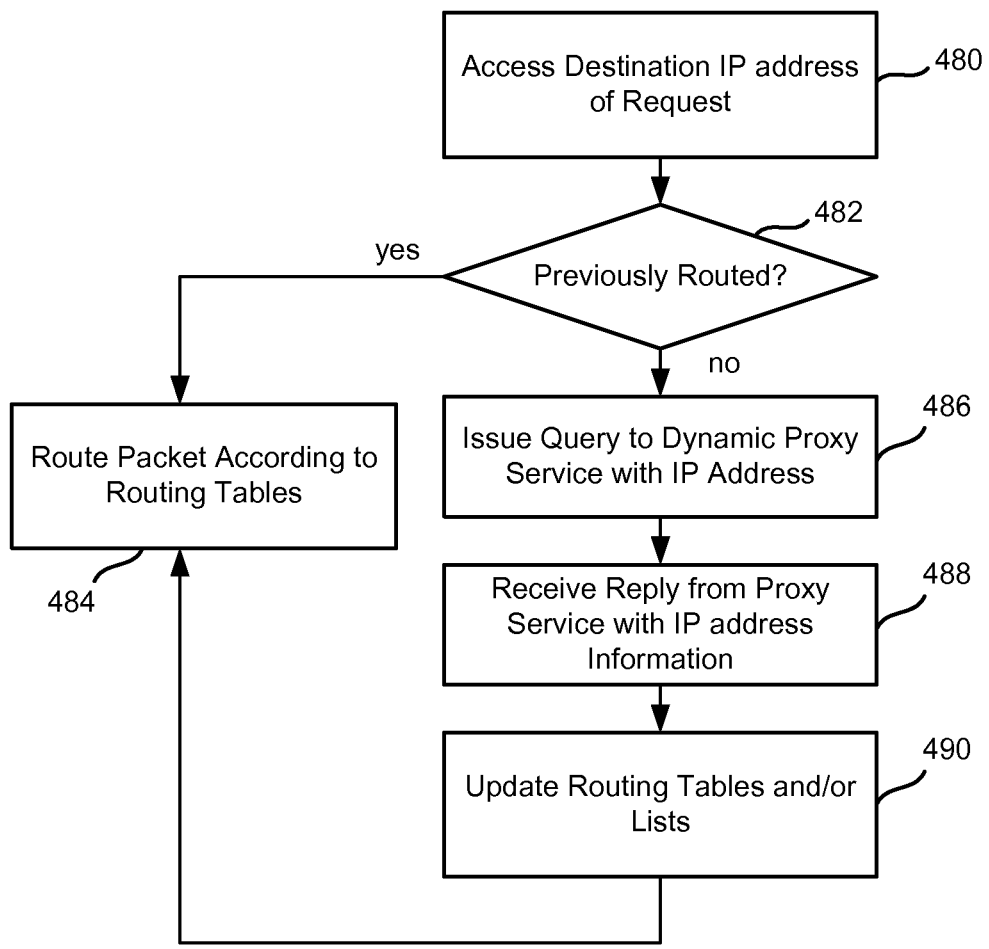
FIG. 7 is a flowchart describing a process for dynamically updating routing tables to selectively route network traffic over a tunneled connection to a proxy service.

FIG. 7 is a flowchart describing a process for dynamically updating routing tables to selectively route network traffic over a tunneled connection to a proxy service. A process is described that can efficiently communicate to a client device which IP addresses should have associated traffic routed using a tunnel connection to the proxy service, and which IP addresses can be routed directly over a standard network connection. The process of FIG. 7 can be performed by a client device to dynamically generate a list of tunneled IP addresses based on the behavior of the particular client device. In one embodiment, the process of FIG. 7 can be used without passing an initial list of any IP addresses to the client. Over time rather, the client can be configured to identify routing information only for those IP addresses that are actually used by the client. In another example, an initial list of tunneled and/or whitelisted IP addresses can be passed to the client and the process in FIG. 7 is used to update the lists and/or routing tables.

At step 480, the selective routing agent at the client device accesses a destination IP address associated with a network packet such as resource request. The selective routing agent determines whether a packet associated with the IP address has been previously routed by the agent at step 482. In one embodiment, the system accesses the routing tables at step 482 to determine whether the selective routing agent has previously provided or modified an entry for the IP address. In another embodiment, the selective routing agent maintains a whitelist and determines at step 482 whether the IP address is on the whitelist indicating that network traffic associated with the IP address can be routed over the default network interface. If the agent determines that a packet has previously been routed for the IP address, such as by determining that it has been whitelisted, the agent routes the request according to the routing tables for the IP address. If the routing tables indicate that the IP address is whitelisted, the network packet is routed using the default network interface according to the routing tables at step 484. If the routing tables indicate that the IP address is not whitelisted, the network packet is routed using the tunnel network interface according to the routing tables at step 484.

If the selective routing agent has not previously routed a packet for the requested IP address, it issues a query to the proxy service at step 486, passing the requested IP address. The query may be issued over tunneled connection 140 in one embodiment. In another example, the query may be passed over a backend channel separate from the network communication over the tunneled connection. At step 488, the client device receives a reply from the proxy service with IP address information for the destination IP address. The reply may include a category for the IP address, or a rule instructing the client device to whitelist or add the IP address to a list of tunneled IP address.

At step 490, the selective routing agent updates the client routing tables based on the rule or information received from the proxy service. If the proxy service indicates that traffic for the IP address should be tunneled, the selective routing agent updates the routing tables with information for the tunneled connection to the proxy service. If the proxy service indicates that the IP address can be whitelisted, the proxy service can add the IP address to a whitelist at the client device and/or update the routing tables. The selective agent can then route subsequent requests to a remote network without issuing a query. After updating the routing tables and/or lists at step 490, the selective routing agent routes the packet according to the client routing tables at step 484.

Figure 8:
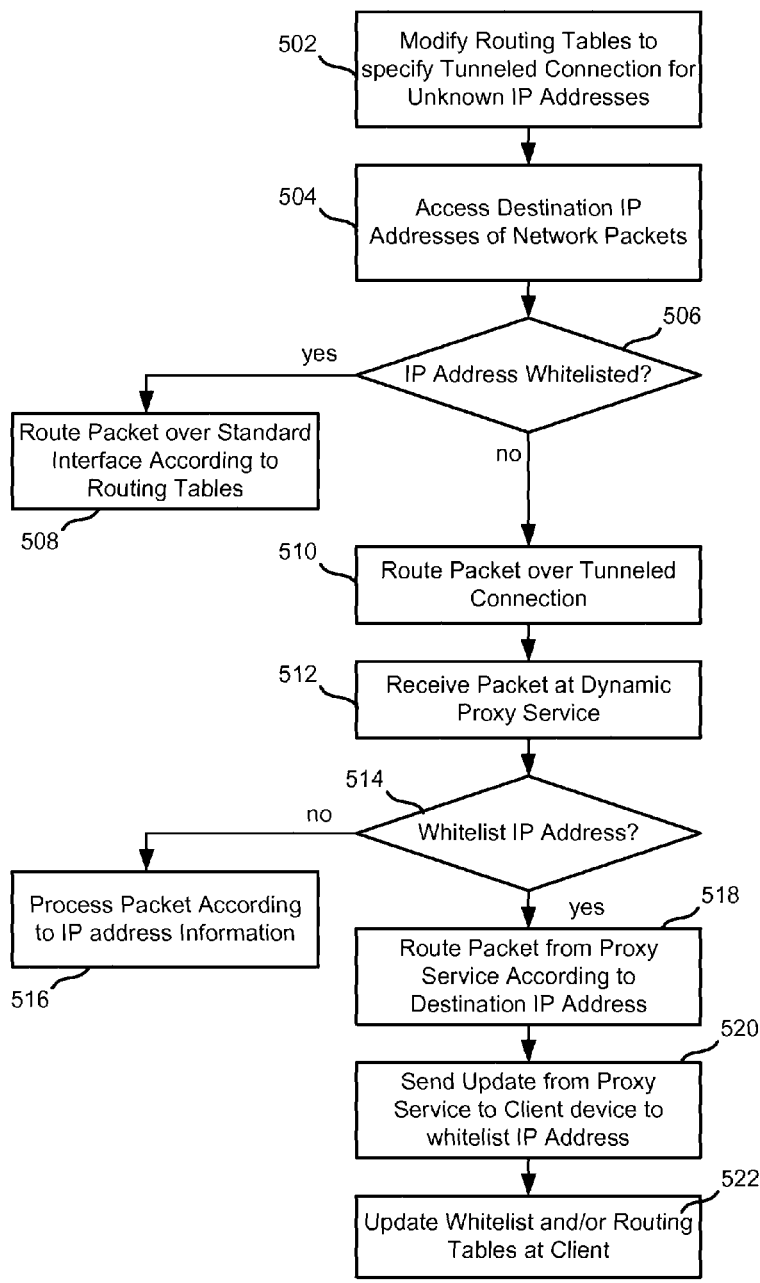
FIG. 8 is a flowchart describing another process for dynamically modifying routing tables at a client device to selectively route network traffic over a tunneled connection.

FIG. 8 is a flowchart describing another process for dynamically modifying routing tables at a client device to selectively route network traffic over a tunneled connection. As in FIG. 7, the process can be used without passing an initial list of any IP addresses to the client. The client is again configured to identify routing information only for those IP addresses that are actually used by the client. In another example, an initial list of tunneled and/or whitelisted IP addresses can be passed to the client and the process in FIG. 8 is used to update the lists and/or routing tables using steps 504-522. At step 502, the selective routing agent modifies the routing tables so that all non-whitelisted IP addresses are set for routing over the tunneled connection. Step 502 can include setting the destination for all remote IP addresses to the tunneled connection with the proxy service in one example. In this manner, the selective routing agent can blacklist all IP addresses initially for routing to the dynamic proxy service. In another example, step 502 may include whitelisting a subset of IP addresses so that the routing tables specify routing over the standard network interface. It is noted that step 502 may be performed as part of an initial provisioning of the selective routing agent in one embodiment. After setting all unknown IP addresses for tunneled routing, the system can proceed to update the routing tables as actual requests are made by the client in steps 504-522.

At step 504, the selective routing agent accesses the destination IP addresses of each network packet. Step 504 may be performed in response to a resource request issued by an application at the client. At step 506, the selective routing agent determines whether the requested IP address for each packet is whitelisted or otherwise designated for routing over a direct network connection. In one example, step 506 can include determining whether the routing tables for the IP address specify a destination other than the tunneled connection to the proxy service. If the routing tables indicate a destination other than the tunneled connection, the agent determines that the address is whitelisted. If the routing tables indicate the tunneled connection, the agent determines that the address is not whitelisted.

If a requested address is whitelisted, the selective routing agent issues the network packet for routing using the default interface according to the routing tables at step 508. If the address is not whitelisted, the selective routing agent routes the network packet over the tunnel connection to the dynamic proxy service at step 510.

The dynamic proxy service receives the packet at step 512 and determines whether the IP address associated with the packet should be whitelisted, indicating that an update at the client device is needed. If the IP address is not to be whitelisted, the proxy service processes the packet according to the IP address information, etc. at step 516 as described in FIG. 6. If, however, the IP address should be whitelisted, the proxy service routes the packet according to its destination IP address at step 518. The proxy service also sends an update at step 520 to the client device to whitelist the IP address for future routing. The update at step 520 may be sent over the tunneled connection in one example. In another example, a separate communication, for example over a backend channel may be used to transmit the whitelist update. At step 522, the client device receives the update from the proxy service and adds the IP address to a whitelist at the client device. The whitelist indicates that future packets associated with the IP address can be routed over the standard network interface, rather than over the tunneled connection to the proxy service. In one embodiment, the client device can update the routing tables at the client device to indicate that request for the IP address can be routed over the standard network interface to remote networks.

Figure 9:
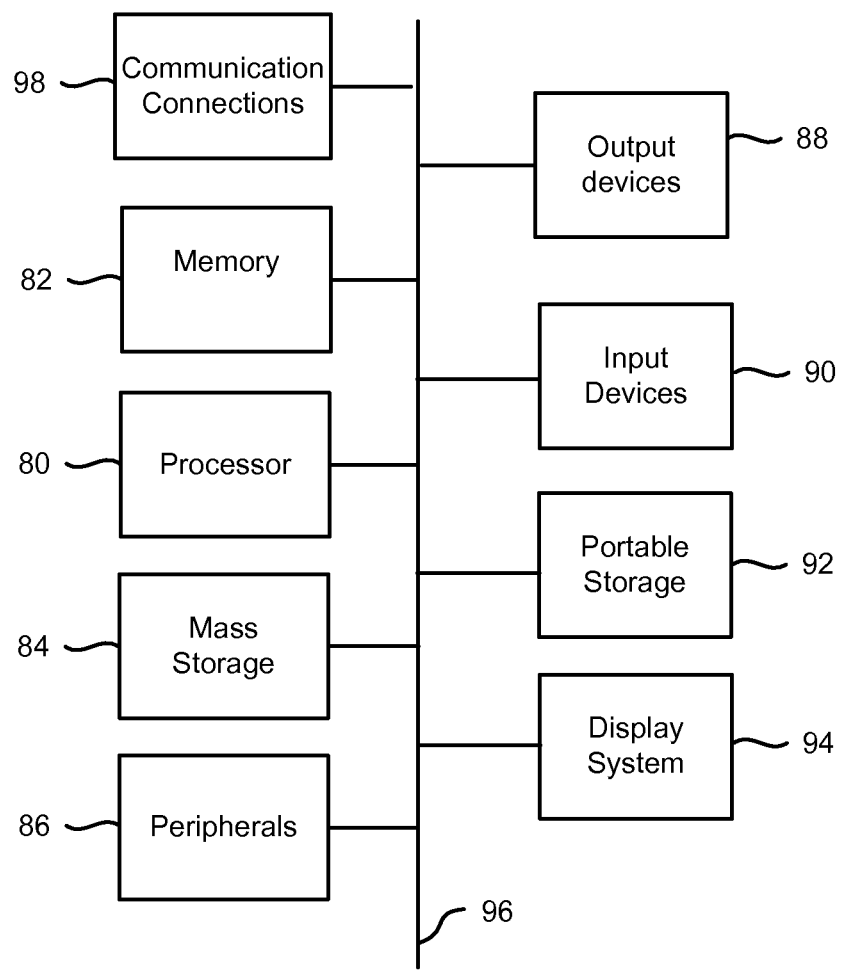
FIG. 9 is a simplified block diagram of a computing device that can be used to implement various embodiments of the disclosed technology.

FIG. 9 is a high level block diagram of a computing system which can be used to implement a client 102, dynamic proxy service 104, or server 110. The computing system of FIG. 9 includes processor 80, memory 82, mass storage device 84, peripherals 86, output devices 88, input devices 90, portable storage 92, and display system 94. For purposes of simplicity, the components shown in FIG. 9 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 9 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for non-transitory storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

Accordingly, there has been described a method of selective routing of internet protocol (IP) address-based traffic over one or more computer networks that includes providing at a client device a default network interface and a tunnel interface having a direct connection to a remote server, providing at the client device a selective routing agent configured to selectively route network packets from the client device over the default network interface and the tunnel interface, configuring one or more routing tables at the client device for routing network packets associated with a first set of IP addresses over the default network interface and routing network packets associated with a second set of IP addresses over the tunnel interface to the remote server, receiving at the client device an indication that a first IP address in the first set of IP addresses should be routed over the tunnel interface to the remove server, and in response to the indication, reconfiguring the one or more routing tables for routing network packets associated with the first IP address over the tunnel interface to the remote server.

There has been described a client device that includes a default network interface, a tunnel interface configured to provide a direct connection to a remote server, and one or more processors configured to selectively route network packets from the client device over the default network interface and the tunnel interface. The one or more processors are configured to modify one or more routing tables at the client device for routing network packets associated with a first set of IP addresses over the default network interface and routing network packets associated with a second set of IP addresses over the tunnel interface to the remote server. The one or more processors are configured to receive at the client device an indication that a first IP address in the first set of IP addresses should be routed over the tunnel interface to the remove server, and in response to the indication, modify the one or more routing tables for routing network packets associated with the first IP address over the tunnel interface to the remote server.

A method of selective routing of internet protocol (IP) address-based traffic over one or more computer networks has been described that includes providing at a client device a default network interface and a tunnel interface having a direct connection to a remote server, providing at the client device a selective routing agent configured to selectively route network packets from the client device over the default network interface and the tunnel interface, configuring one or more routing tables at the client device for routing network packets associated with a first set of IP addresses over the default network interface and routing network packets associated with a second set of IP addresses over the tunnel interface to the remote server, receiving a network packet associated with a first IP address in the second set of IP addresses, if the direct connection to the remote server is available, routing the network packet using the tunnel interface to the remote server, and if the direct connection to the remote server is unavailable, terminating the network packet at the client device.

A method of selective routing of internet protocol (IP) address-based traffic over one or more computer networks has been described that includes accessing one or more routing tables in response to a first network packet associated with a first IP address, based on the one or more routing tables, routing the first network packet associated with the first IP address over a tunnel interface having a direct connection with a remote server, receiving an indication from the remote server that the first IP address can be routed over a default network interface at the client device, in response to the indication from the remote server, modifying the one or more routing tables to specify routing of the first IP address over the default network interface at the client device, after modifying the one or more routing tables, accessing the one or more routing tables in response to a second network packet associated with the first IP address, and based on the one or more routing tables, routing the second network packet associated with the first IP address over the default network interface.

A method of selective routing of internet protocol (IP) address-based traffic over one or more computer networks has been described that includes receiving at one or more servers including a proxy service a first network packet over a tunneled connection with a client device, determining that network traffic from the client device for a first IP address associated with the first network packet can be routed independently of the proxy service at the one or more servers, and generating a message to the client device including an indication that the first IP address can be routed over a default network interface at the client device.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of selective routing of internet protocol (IP) address-based traffic over one or more computer networks, comprising:
   providing at a client device a default network interface and a tunnel interface having a direct connection to a remote server;
   providing at the client device a selective routing agent configured to selectively route network packets from the client device over the default network interface and the tunnel interface;
   configuring one or more routing tables at the client device for routing network packets associated with a first set of IP addresses over the default network interface and routing network packets associated with a second set of IP addresses over the tunnel interface to the remote server;
   receiving at the client device an indication that a first IP address in the first set of IP addresses should be routed over the tunnel interface to the remove server;
   in response to the indication, reconfiguring the one or more routing tables for routing network packets associated with the first IP address over the tunnel interface to the remote server; and
   receiving a set of IP address rules associated with a proxy service at the remote server, the set of IP address rules including the second set of IP addresses;
   wherein configuring the one or more routing tables at the client device includes associating the tunnel interface with the second set of IP addresses in the one or more routing tables based on the set of IP address rules.

2. The method of claim 1, further comprising:
   routing a first network packet associated with the first IP address over the default network interface prior to reconfiguring the one or more routing tables in response to the indication.

3. The method of claim 1, wherein the set of IP address rules is a first set of IP address rules, the method further comprising:
   receiving a second set of IP address rules after receiving the first set of IP address rules, the second set of IP address rules including the indication that the first IP address should be routed over the tunnel interface;
   wherein the one or more routing tables are reconfigured in response to receiving the second set of IP address rules.

4. The method of claim 1, further comprising:
   prior to receiving the indication at the client device, determining for a first network packet that the first IP address has not been previously routed by the selective routing agent;
   issuing a query to the remote server including the first IP address in response to said determining; and receiving a reply from the remote server including the indication that the first IP address should be routed over the tunnel interface.

5. The method of claim 1, further comprising:
accessing the one or more routing tables in response to a first network packet associated with a second IP address;
based on the one or more routing tables, routing the first network packet associated with the second IP address over the tunnel interface;
receiving an indication from the remote server that the second IP address can be routed over the default network interface at the client device;
in response to the indication from the remote server, modifying the one or more routing tables to specify routing of the second IP address over the default network interface at the client device;
after modifying the one or more routing tables, accessing the one or more routing tables in response to a second network packet associated with the second IP address; and
based on the one or more routing tables, routing the second network packet associated with the second IP address over the default network interface.

6. The method of claim 1, further comprising:
after reconfiguring the one or more routing tables, receiving a first network packet associated with the first IP address;
in response to the first network packet, determining whether the direct connection to the remote server is available;
if the direct connection to the remote server is available, routing the network packet using the tunnel interface to the remote server; and
if the direct connection to the remote server is unavailable, terminating the first network packet at the client device.

7. A client device, comprising:
a default network interface;
a tunnel interface configured to provide a direct connection to a remote server; and
one or more processors configured to:
selectively route network packets from the client device over the default network interface and the tunnel interface;
modify one or more routing tables at the client device for routing network packets associated with a first set of IP addresses over the default network interface and routing network packets associated with a second set of IP addresses over the tunnel interface to the remote server;
receive at the client device an indication that a first IP address in the first set of IP addresses should be routed over the tunnel interface to the remove server;
in response to the indication, modify the one or more routing tables for routing network packets associated with the first IP address over the tunnel interface to the remote server;
receive a first set of IP address rules associated with a proxy service at the remote server, the first set of IP address rules including the second set of IP addresses; and
modify the one or more routing tables at the client device by associating the tunnel interface with the second set of IP addresses in the one or more routing tables based on the first set of IP address rules.

8. The client device of claim 7, wherein the one or more processors are configured to:
receive a second set of IP address rules after receiving the first set of IP address rules, the second set of IP address rules including the indication that the first IP address should be routed over the tunnel interface; and
modify the one or more routing tables in response to receiving the second set of IP address rules.

9. The client device of claim 7, wherein the one or more processors are configured to:
route a first network packet associated with the first IP address over the default network interface prior to reconfiguring the one or more routing tables based on the indication.

10. The client device of claim 7, wherein the one or more processors are configured to:
prior to receiving the indication at the client device, determine for a first network packet that the first IP address has not been previously routed by the selective routing agent;
issue a query to the remote server including the first IP address based on said determining; and
receive a reply from the remote server including the indication that the first IP address should be routed over the tunnel interface.

11. The client device of claim 7, wherein the one or more processors are configured to:
access the one or more routing tables in response to a first network packet associated with a second IP address;
based on the one or more routing tables, route the first network packet associated with the second IP address over the tunnel interface;
receive an indication from the remote server that the second IP address can be routed over the default network interface at the client device;
based on the indication from the remote server, modify the one or more routing tables to specify routing of the second IP address over the default network interface at the client device;
after modifying the one or more routing tables, access the one or more routing tables in response to a second network packet associated with the second IP address; and
based on the one or more routing tables, route the second network packet associated with the second IP address over the default network interface.

12. The client device of claim 7, wherein the one or more processors are configured to:
after reconfiguring the one or more routing tables, receive a first network packet associated with the first IP address;
in response to the first network packet, determine whether the direct connection to the remote server is available;
if the direct connection to the remote server is available, route the network packet using the tunnel interface to the remote server; and
if the direct connection to the remote server is unavailable, terminate the first network packet at the client device.

13. A method of selective routing of internet protocol (IP) address-based traffic over one or more computer networks, comprising:
providing at a client device a selective routing agent configured to selectively route network packets from the client device;

providing a default network interface at the client device and a tunnel interface having a direct connection to a remote server;

determining whether a first IP address of a first network request has been previously routed by the selective routing agent;

if the first IP address has not been previously routed by the selective routing agent, issuing a query to the remote server including the first IP address;

receiving a reply from the remote server indicating that the first IP address can be routed over the default network interface; and in response to the indication from the remote server, modifying the one or more routing tables to specify routing of the first IP address over the default network interface at the client device.

14. The method of claim 13, wherein:

determining whether the first IP address of the first network request has been previously routed by the selective routing agent includes determining whether the first IP address is on one or more of a first list of IP addresses to be routed over the default network interface and a second list of IP addresses to be routed over the tunnel interface; and the method further comprises in response to the indication from the remote server, updating the first list of IP addresses to include the first IP address.

15. The method of claim 14, further comprising:

issuing a query to the remote server including a second IP address associated with a second network request;

receiving a reply from the remote server in response to the query including the second IP address, the reply in response to the query including the second IP address indicating that the second IP address should be routed over the tunnel interface; and in response to the reply from the remote server for the query including the second IP address, updating the second list of IP addresses for routing over the tunnel interface to include the second IP address.

16. A method of selective routing of internet protocol (IP) address-based traffic over one or more computer networks, comprising:

receiving at one or more servers including a proxy service a first network packet over a tunneled connection with a client device, wherein the tunnel connection provides a direct connection between the one or more servers and the client device;

determining that network traffic from the client device for a first IP address associated with the first network packet can be routed independently of the proxy service at the one or more servers;

generating a message to the client device including an indication that the first IP address can be routed over a default network interface at the client device; and prior to receiving the first network packet, providing to the client device a first set of rules including an indication that a range of IP addresses including the first IP address should be routed over the tunneled connection with the client device.

17. The method of claim 16, further comprising:

providing a selective routing agent to the client device prior to receiving the first network packet, the selective routing agent is configured to modify one or more routing tables at the client device to specify routing of the range of IP addresses over the tunneled connection.

18. The method of claim 17, further comprising:

receiving by the selective routing agent the message including the indication that the first IP address can be routed over the default network interface; and modifying the one or more routing tables at the client device to specify routing of the first IP address over the default network interface.

* * * * *